United States Patent [19]
Sawdon

[11] Patent Number: 5,871,250
[45] Date of Patent: Feb. 16, 1999

[54] SEALED STRAIGHT LINE GRIPPER

[75] Inventor: Edwin G. Sawdon, St. Clair, Mich.

[73] Assignee: BTM Corporation, Marysville, Mich.

[21] Appl. No.: 829,077

[22] Filed: Mar. 31, 1997

[51] Int. Cl.$^6$ .............................. B25J 15/08; B25J 19/02
[52] U.S. Cl. .................. 294/88; 294/119.1; 294/907; 901/37; 901/46
[58] Field of Search .................. 294/94, 88, 115, 294/116, 119.1, 907; 901/37, 39, 46; 269/32, 34, 233, 234

[56] References Cited

U.S. PATENT DOCUMENTS

| | | |
|---|---|---|
| D. 334,701 | 4/1993 | Blatt et al. . |
| 1,667,616 | 4/1928 | Wright et al. . |
| 1,736,171 | 11/1929 | Powell . |
| 1,790,761 | 2/1931 | Ortolon . |
| 2,381,999 | 8/1945 | Bonnafe . |
| 2,845,847 | 8/1958 | Blatt et al. . |
| 3,027,155 | 3/1962 | Paterson . |
| 3,058,214 | 10/1962 | Mekler . |
| 3,273,878 | 9/1966 | Blatt . |
| 3,365,253 | 1/1968 | Haller . |
| 3,371,923 | 3/1968 | Blatt . |
| 3,469,892 | 9/1969 | Langstroth . |
| 3,545,050 | 12/1970 | Blatt et al. . |
| 3,565,415 | 2/1971 | Blatt . |
| 3,570,835 | 3/1971 | McPherson . |
| 3,618,931 | 11/1971 | Blatt . |
| 3,702,185 | 11/1972 | Blatt . |
| 3,724,837 | 4/1973 | McPherson . |
| 3,863,961 | 2/1975 | Dinning . |
| 4,019,784 | 4/1977 | Ladin et al. . |
| 4,021,027 | 5/1977 | Blatt . |
| 4,234,057 | 11/1980 | Nakane et al. . |
| 4,240,620 | 12/1980 | Tunkers . |
| 4,273,372 | 6/1981 | Sheshtawy . |
| 4,365,792 | 12/1982 | Johns . |
| 4,396,183 | 8/1983 | Lymburner . |
| 4,445,676 | 5/1984 | Tunkers . |
| 4,451,026 | 5/1984 | Coope . |
| 4,458,889 | 7/1984 | McPherson et al. . |
| 4,494,739 | 1/1985 | Valentine . |
| 4,496,138 | 1/1985 | Blatt . |
| 4,518,187 | 5/1985 | Blatt et al. . |

(List continued on next page.)

FOREIGN PATENT DOCUMENTS

| | | |
|---|---|---|
| 0 317 924 A2 | 11/1988 | European Pat. Off. . |
| 0 341 155 A1 | 5/1989 | European Pat. Off. . |
| 0 508 881 A2 | 4/1992 | European Pat. Off. . |
| 2 340 798 | 8/1980 | France . |
| 2 484 310 | 12/1981 | France . |
| 3306 526 A1 | 8/1984 | Germany . |
| 25 55 207 A1 | 7/1986 | Germany . |
| 263-740 | 1/1989 | Germany ............................ 294/119.1 |
| 1771955 | 10/1992 | U.S.S.R. ............................ 291/119.1 |
| 1036830 | 7/1966 | United Kingdom . |
| 2 082 945 | 3/1982 | United Kingdom . |

OTHER PUBLICATIONS

PHD Solutions for Factory Automation Grippers, pp. 6–1 to 6–77, 1993.
PHD Series GRC Parallel Grippers, pp. 1–20, 1996.
PHD Series GRD Parallell Grippers, pp. 1–16, 1996.
PHD Series 190 & 191 Parallel Grippers, pp. 1–16, 1995.
1500 Series Omni–Head Power Clamps, BTM Corporation, pp. 1–7 (prior to Jan. 1997).
Power Clamps & Grippers, BTM Corporation, pp. 1–23 (prior to Jan. 1997).
Grippers for High Speed Part Transfer in Press, BTM Corporation, pp. 1–15 (prior to Jan. 1997).

(List continued on next page.)

*Primary Examiner*—Dean Kramer
*Attorney, Agent, or Firm*—Harness, Dickey & Pierce, P.L.C.

[57] ABSTRACT

A straight line motion gripper employs a longitudinally moving piston head, a laterally moving slide and a drive pin moving the slide in response to movement of the piston head. The drive pin is mounted to the piston head and disposed at an angle. Another aspect of the present invention provides a booster spring to maintain a pair of gripper arms in gripping positions even when pneumatic pressure is lost.

37 Claims, 9 Drawing Sheets

U.S. PATENT DOCUMENTS

| | | |
|---|---|---|
| 4,570,914 | 2/1986 | Blatt . |
| 4,591,138 | 5/1986 | Baills et al. . |
| 4,596,415 | 6/1986 | Blatt . |
| 4,618,131 | 10/1986 | Campisi et al. . |
| 4,620,696 | 11/1986 | Blatt . |
| 4,621,853 | 11/1986 | Fink .......................................... 294/116 |
| 4,637,597 | 1/1987 | McPherson et al. . |
| 4,647,097 | 3/1987 | Lessway . |
| 4,647,100 | 3/1987 | Lessway . |
| 4,673,173 | 6/1987 | Shochi et al. . |
| 4,696,503 | 9/1987 | Collodel . |
| 4,707,013 | 11/1987 | Vranish et al. . |
| 4,723,767 | 2/1988 | McPherson et al. . |
| 4,723,806 | 2/1988 | Yuda . |
| 4,729,588 | 3/1988 | Kratzer ................................. 294/119.1 |
| 4,768,821 | 9/1988 | Hucul et al. . |
| 4,777,445 | 10/1988 | Kahl . |
| 4,793,602 | 12/1988 | McPherson . |
| 4,834,663 | 5/1989 | Kahl . |
| 4,836,091 | 6/1989 | Taylor . |
| 4,854,564 | 8/1989 | McPherson et al. . |
| 4,859,138 | 8/1989 | Brocklebank et al. . |
| 4,863,150 | 9/1989 | Hodl et al. . |
| 4,865,375 | 9/1989 | Laub et al. . |
| 4,892,344 | 1/1990 | Takada et al. . |
| 4,905,973 | 3/1990 | Blatt . |
| 4,921,233 | 5/1990 | Fabrice . |
| 5,072,652 | 12/1991 | Blatt . |
| 5,090,757 | 2/1992 | Huber et al. .......................... 294/119.1 |
| 5,118,088 | 6/1992 | Sawdon . |
| 5,125,632 | 6/1992 | Blatt et al. . |
| 5,125,708 | 6/1992 | Borcea et al. ........................ 294/119.1 |
| 5,152,566 | 10/1992 | Blatt et al. . |
| 5,152,568 | 10/1992 | Blatt . |
| 5,163,729 | 11/1992 | Borcea et al. . |
| 5,165,670 | 11/1992 | Sawdon . |
| 5,171,001 | 12/1992 | Sawdon . |
| 5,174,709 | 12/1992 | Blatt et al. . |
| 5,190,334 | 3/1993 | Sawdon . |
| 5,222,854 | 6/1993 | Blatt et al. . |
| 5,277,411 | 1/1994 | Justus . |
| 5,299,847 | 4/1994 | Blatt et al. . |
| 5,452,981 | 9/1995 | Crorey et al. . |
| 5,490,663 | 2/1996 | Stojkovic et al. . |
| 5,516,173 | 5/1996 | Sawdon . |
| 5,595,413 | 1/1997 | McGeachy et al. ................. 294/119.1 |
| B1 4,905,973 | 7/1994 | Blatt . |

OTHER PUBLICATIONS

Sealed Power Clamps, BTM Corporation, pp. 1–10 (prior to Jan. 1997).

Sealed Toggle Clamps, BTM Corporation, 4 pages (prior to Jan. 1997).

1500 Series Power Grippers and Acessories, BTM Corporation, 4 pages (prior to Jan. 1997).

Power Clamp 1500 Series, BTM Corporation, 10 pages (prior to Jan. 1997).

Optional AC & DC Electrical Proximity Switches for BTM Power Clamps, BTM Corporation, 2 pages (prior to Jan. 1997).

BTM Omni–Head Mini–Power Clamps, New Concept in Industrial Power Clamps Simplifies Off–Center Mounting, BTM Corporation, 3 pages (prior to Mar. 31, 1997).

BTM Omni–Head 100 Series Mini–Power Clamps, How to Order BTM Power Clamps, BTM Corporation, 1 page, (prior to Mar. 31, 1997).

Thin Power Clamps, 2500–2000–390 Series, 1500–1000–140 Series, BTM Corporation 5 pages, (prior to Mar. 31, 1997).

BTM 1500–1000–140 Series, BTM Corporation, 2 pages, (prior to Mar. 31, 1997).

1500 & 2500 Series Sealed Toggle Clamps, BTM Corporation, 3 pages (prior to Mar. 31, 1997).

1500 & 2500 Series Sealed Offset Toggle Clamps, BTM Corporation, 3 pages (prior to Mar. 31, 1997).

BTM Drawing entitled "BTM PG 1500 P2F Assembly" and BTM Drawing entitled BTM PG 1500 P3F Assembly (prior to Mar. 31, 1997).

PG–38 & PG–45 Locking Grippers, BTM Corporation, 8 pages, (prior to Jan. 1997).

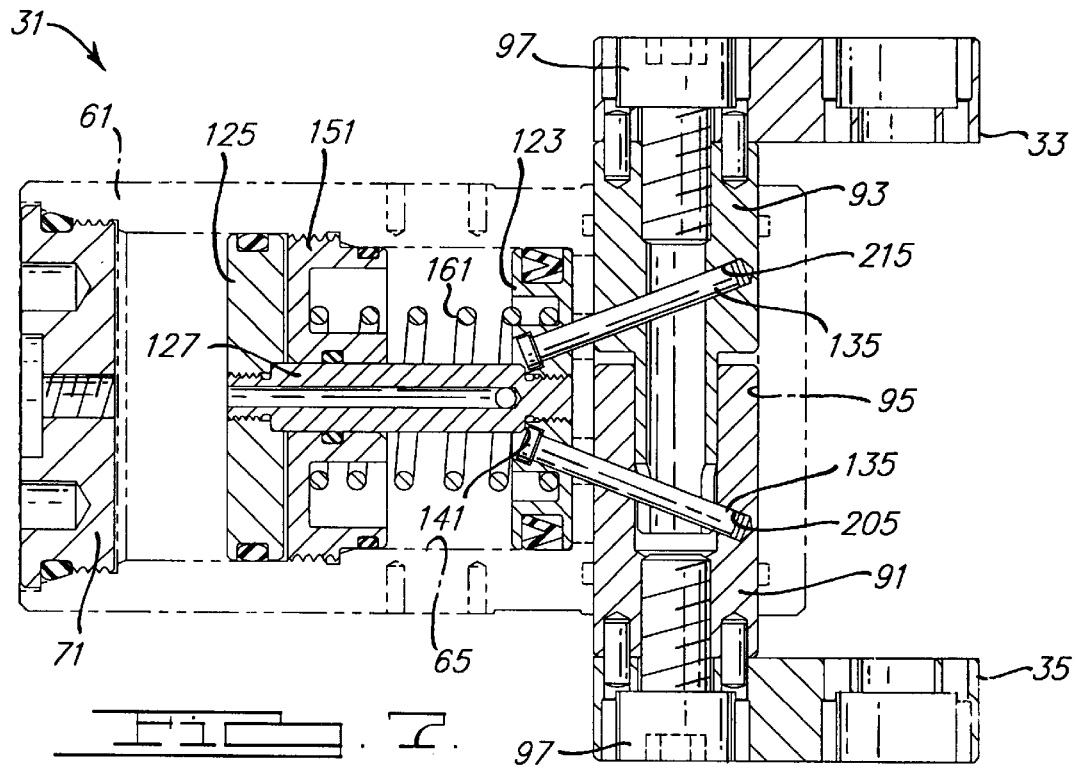
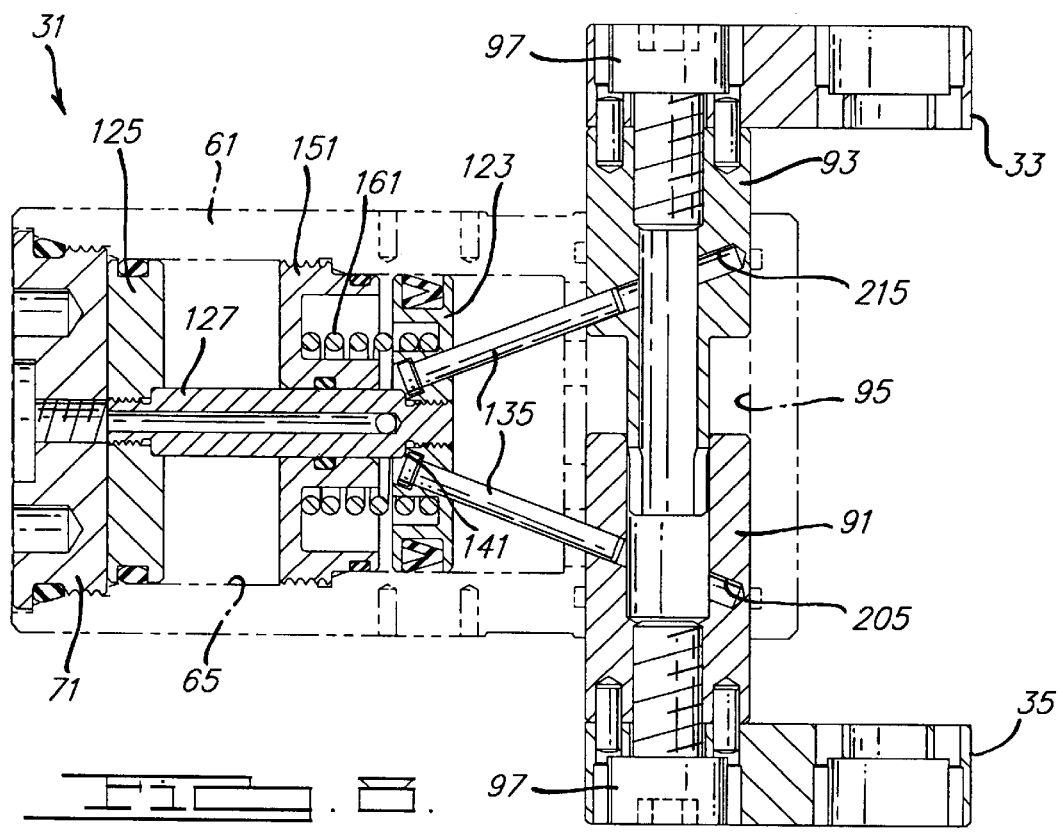

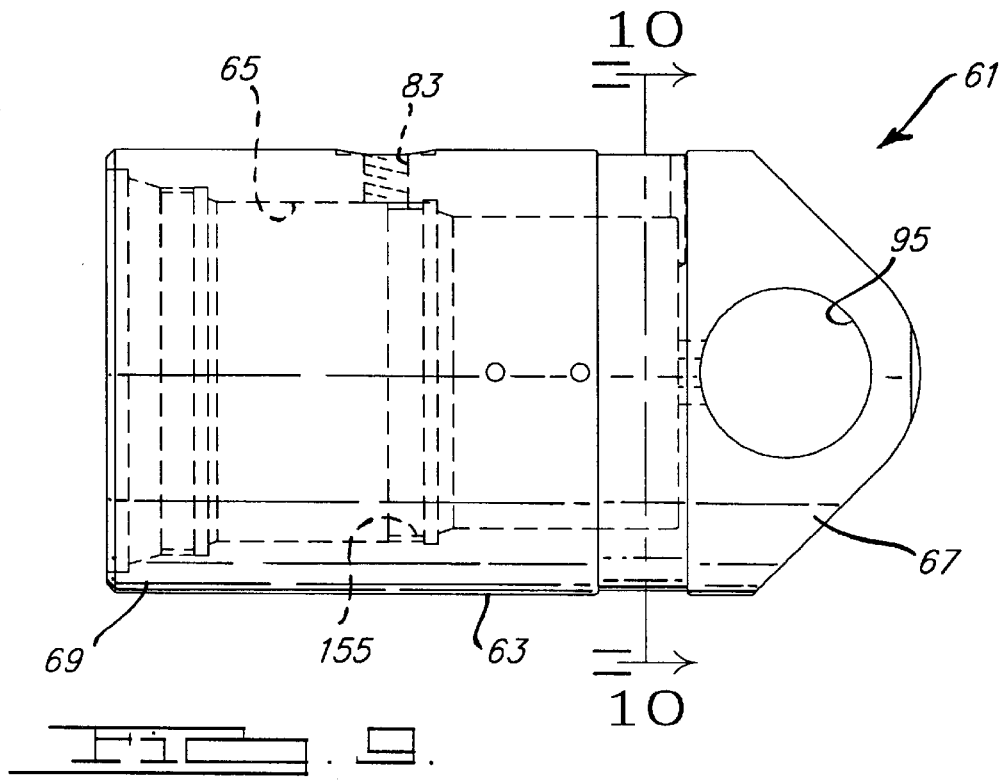
FIG. 9.
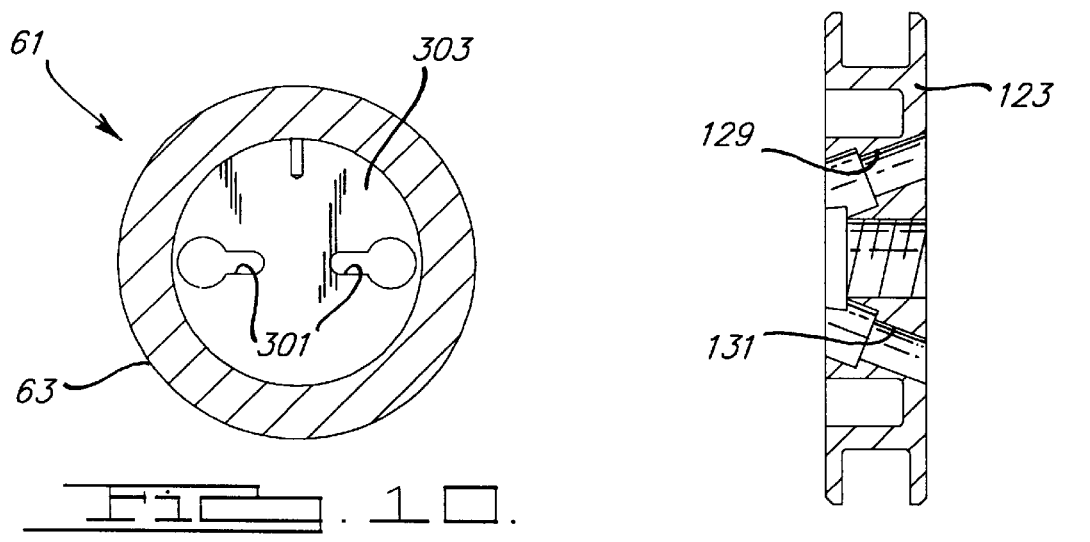
FIG. 10.
FIG. 11.
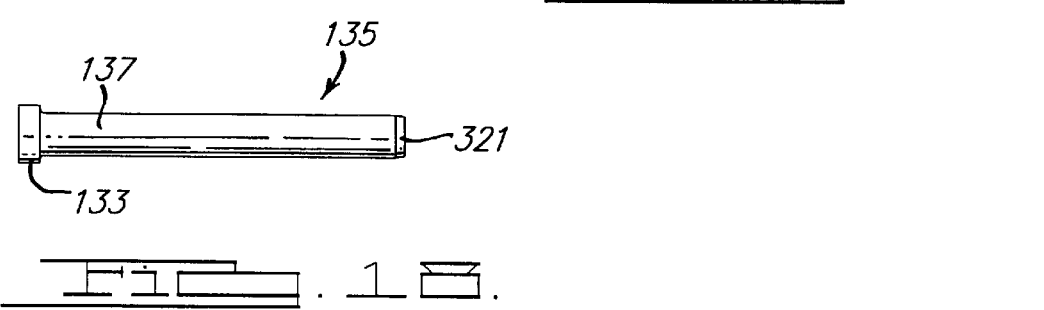
FIG. 12.

SEALED STRAIGHT LINE GRIPPER

BACKGROUND AND SUMMARY OF THE INVENTION

This invention relates generally to grippers and particularly to a sealed, straight line gripper.

It is known in the industry to provide parallel grippers with box-type bodies. These box-type parallel grippers commonly employ a double-acting piston attached to a connecting rod. A cam plate, having angled slots machined therein, forms a wedge. Sliding parallel jaws are attached to the cam plate by pins which are inserted through the angled slots. Typically, these pins are flattened. As the double-acting piston moves in and out, the sliding jaws are forced to close and open with a parallel motion. These traditional bodies and slides have generally rectangular cross sectional exterior shapes. An optional proximity switch is also mounted to the exterior of the gripper body by way of a screwed-on and non-adjustable mounting bracket, which limits the ability to reposition the switch during tool set-up.

Other conventional parallel grippers are constructed with a multitude of complicated linkages, cams and rollers. Examples of such conventional devices are disclosed in the following U.S. Pat. No. 4,892,344 entitled "Parallel Gripper" which issued to Takada et al. on Jan. 9, 1990; U.S. Pat. No. 4,723,806 entitled "Parallel Robotic Gripper" which issued to Yuda on Feb. 9, 1988; U.S. Pat. No. 4,696,503 entitled "Pneumatic Actuated Cam Driven Parallel Gripper" which issued to Collodel on Sep. 29, 1987; U.S. Pat. No. 4,647,100 entitled "Parallel Gripper with Roller Supported Gripper Arms" which issued to Lessway on Mar. 3, 1987; U.S. Pat. No. 4,647,097 entitled "I.D. or O.D. Parallel Gripper" which issued to Lessway on Mar. 3, 1987; and U.S. Pat. No. 4,518,187 entitled "Parallel Movement Gripper Head" which issued to Blaft et al. on May 21, 1985. All of these devices employ a complicated linkage or camming action which make assembly more difficult, are more expensive to machine and increases part costs, while creating durability and accuracy concerns. Additionally, the linkages and cams of these types of traditional grippers enlarge the gripper package, increase the weight, and cause the object being gripped to be an undesirably extended distance away from the piston head. The mechanical moment arm distance between the gripped object and the piston head is thereby increased which reduces the actuating-to-gripping force efficiency and creates tremendous torquing forces on the linkages.

In accordance with the present invention, the preferred embodiment of a straight line gripper employs a longitudinally moving piston head, a laterally moving slide and a drive pin moving the slide in response to movement of the piston head. In another aspect of the present invention, a drive pin is mounted to a piston head and disposed at an angle. In a further aspect of the present invention, a pair of nested slides are moved relative to each other between gripping and ungripping positions by way of outwardly angled drive pins longitudinally moving with a piston head. In yet another aspect of the gripper of the present invention, an external surface of a body and external surfaces of slides are generally circular-cylindrical. An arm is also mounted to each slide in various angular orientations by way of removable locators and a fastener. Another aspect of the present invention provides a booster spring to maintain a pair of gripper arms in gripping positions even when pneumatic pressure is lost. In still another aspect of the present invention, a sensor is mounted to a gripper body only by way of two or more pins retained in an adjacent pair of a set of body holes.

The straight line gripper of the present invention is highly advantageous over traditional constructions. For example, the present invention significantly reduces the number of parts thereby simplifying assembly and reducing part costs while increasing durability and part accuracy through fewer tolerance build-ups. The present invention is also advantageous by providing cylindrical exterior surfaces for the body and slides; these shapes can be easily machined on a lathe in a relatively inexpensive manner. These shapes also encourage easily adjustable mounting.

The specific configuration of the drive pins and slides also allows the center of the gripped part to be positioned within approximately 38 millimeters of the closest point on the front piston head (when disposed in the extended stroke position). This close gripped part-to-piston head distance serves to maximize the gripper's efficiency in the small and lightweight gripper package provided. A double tandem piston can be optionally used to provide additional gripping forces; in this version, the pneumatically powered gripper will provide approximately one kilo-newton of gripping force (using both arms) in response to 5.5 bars (80 psi) of pneumatic pressure input force. By comparison, conventional parallel grippers typically generate less than 625 newtons of gripping force (using both arms) with greater input pressure.

O-ring sealing of the slides assists in maintaining a fully sealed and prelubricated gripper. The present invention is further advantageous by providing interchangeable slides having oppositely angled drive pins and receptacles; this allows for easy reversal of gripping direction given the same piston stroke direction and otherwise identical parts. It is also envisioned that the sections of the drive pins which engage the slides are circular-cylindrical, thereby producing more engagement surface area while preventing the slides from rotating, especially as compared to the traditional flattened pins. This leads to improved positioning accuracy and less part wear. The circular-cylindrical drive pins are also more cost effectively machined. Rotation of the slides and arms is further prevented in the present invention by the use of guiding slots machined in the hardened body. The optional booster spring advantageously prevents the gripper from dropping parts if the fluid power is lost. The present invention gripper is also advantageous over conventional designs by providing an easily adjustable and simple to mount sensor so as to reduce set-up time of the tool and encourage flexibility in the sensor orientation. Additional advantages and features of the present invention will become apparent from the following description and appended claims, taken in conjunction with the accompanying drawings.

BRIEF DESCRIPTION OF THE DRAWINGS

FIG. 7 is a cross sectional view, taken along line 7—7 of FIG. 6, showing the preferred embodiment gripper disposed in a gripping position;

FIG. 8 is a cross sectional view, similar to that of FIG. 7, showing the preferred embodiment gripper disposed in an ungripping position;

FIG. 9 is a side elevational view showing the body of the preferred embodiment gripper;

FIG. 10 is a cross sectional view, taken along line 10—10 of FIG. 9, showing the body of the preferred embodiment gripper;

FIG. 11 is a cross sectional view, similar to that taken along line 7—7 of FIG. 6, showing a front piston of the preferred embodiment gripper;

FIG. 18 is a side elevational view showing a drive pin of the preferred embodiment gripper.

DETAILED DESCRIPTION OF THE PREFERRED EMBODIMENT

Figure 1:
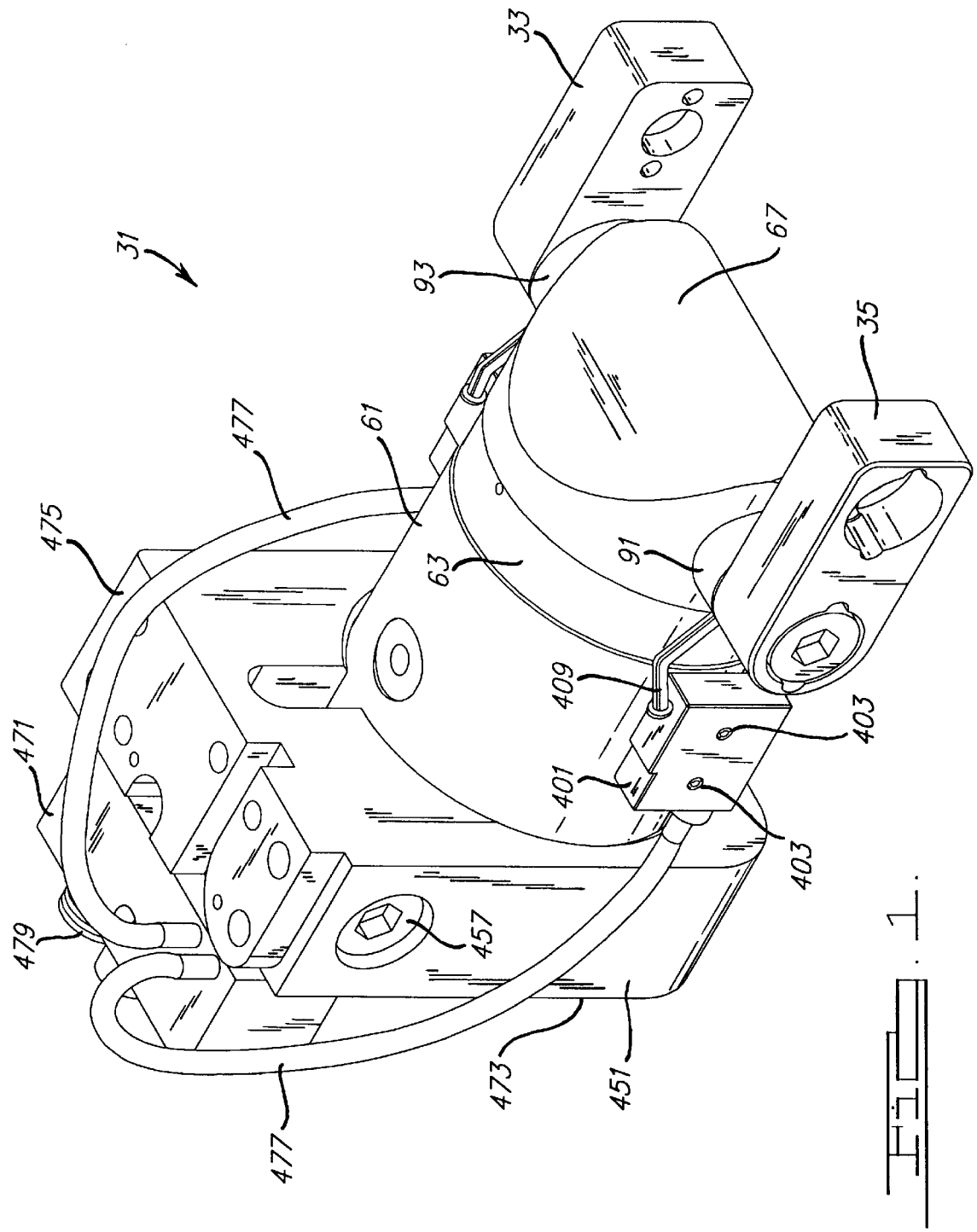
FIG. 1 is a perspective view showing the preferred embodiment of a sealed parallel motion gripper of the present invention.
Figure 2:
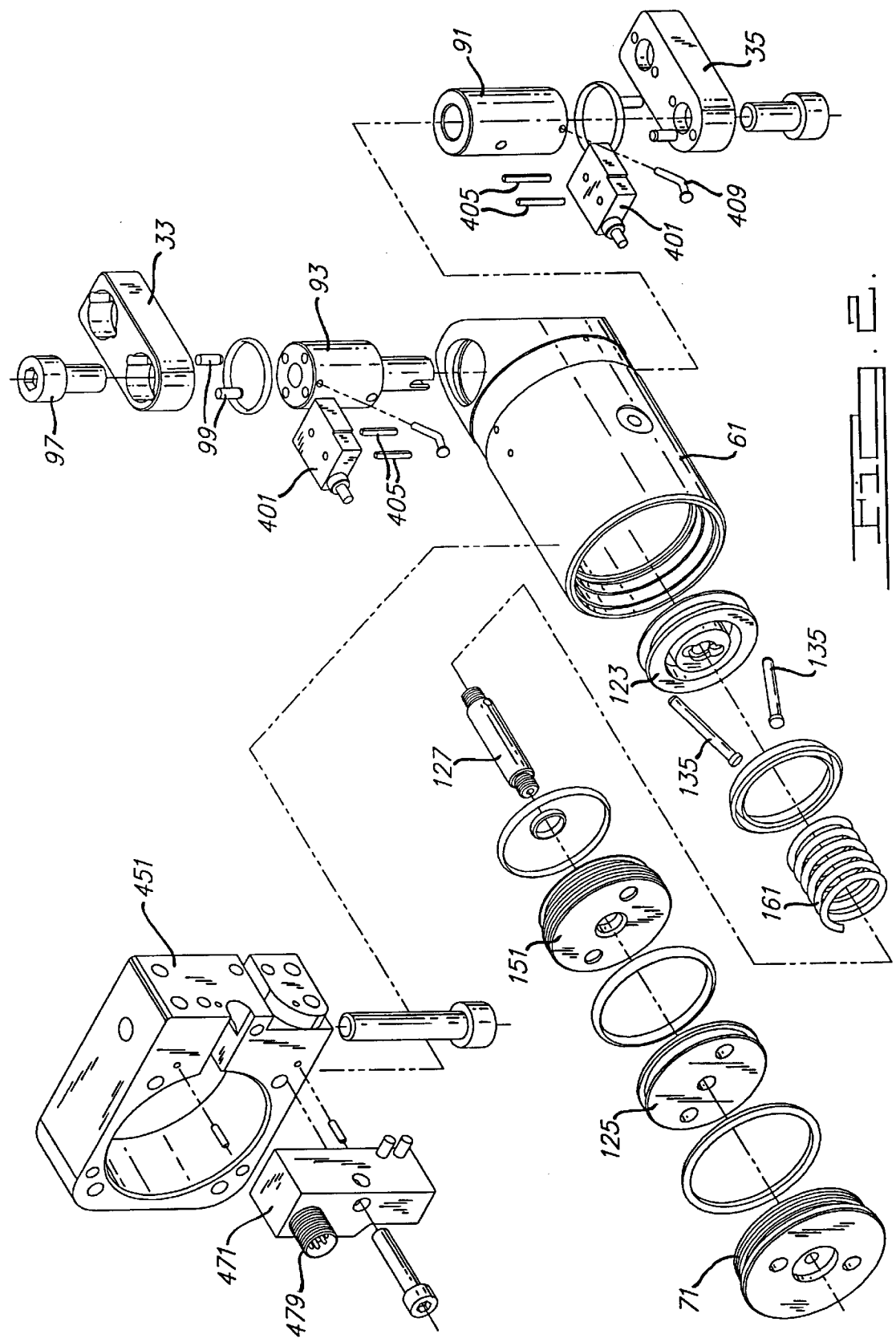
FIG. 2 is an exploded perspective view showing the preferred embodiment gripper.
Figure 3:
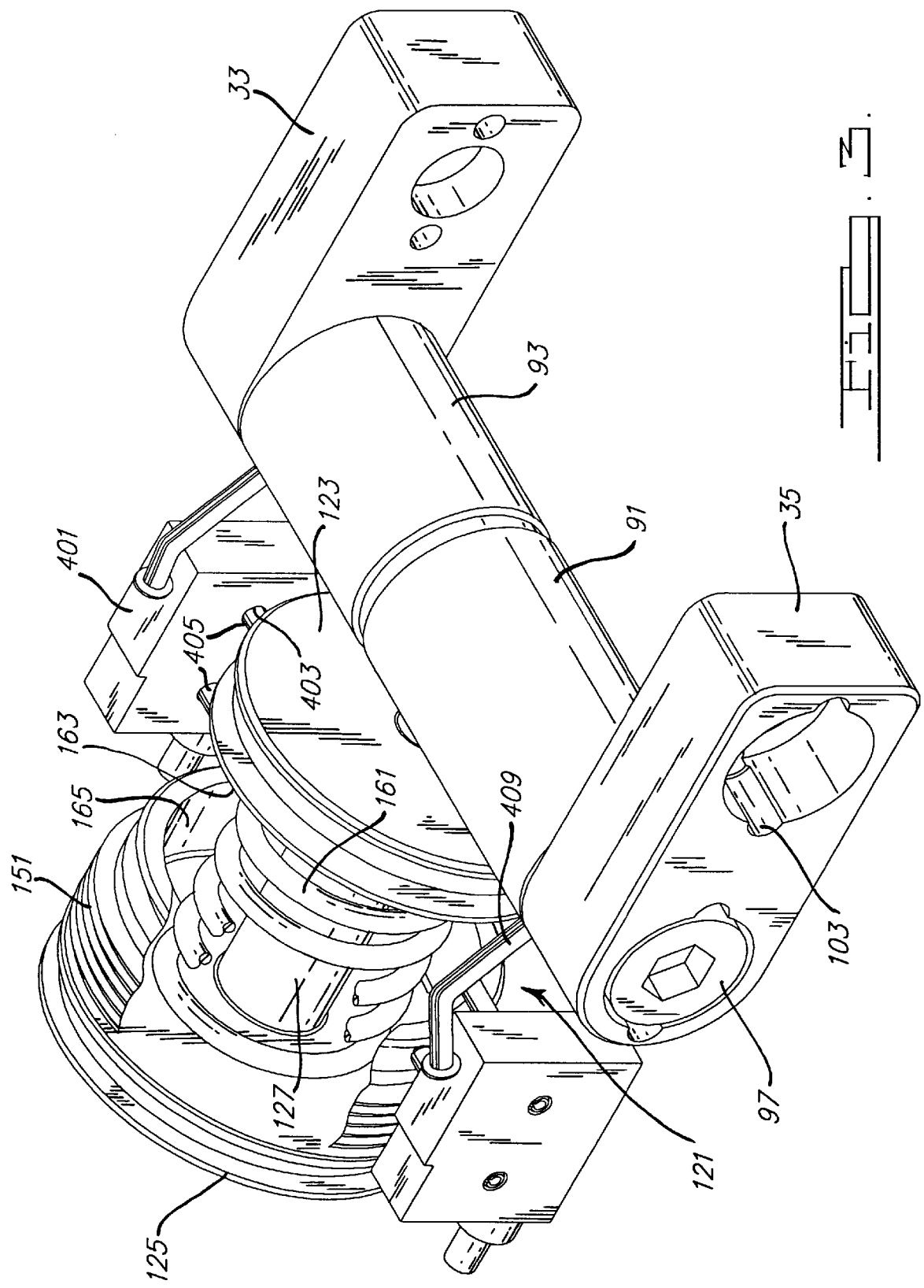
FIG. 3 is a perspective view showing the preferred embodiment gripper with a housing and a mount removed.

Referring to FIGS. 1–6 and 9, a sealed and powered, straight line gripper 31 has a pair of gripping arms 33 and 35 which are linearly movable, in a constantly parallel manner, along a lateral axis 37 in order to grip or clamp a workpiece, such as a rod 39 or sheet of material, between gripping pads 41. Each gripping pad 41 is removably secured to the corresponding arm 33 and 35 by way of a central bolt 43 and a pair of locating dowels 45.

Gripper 31 farther includes a longitudinally elongated body 61 having a circular-cylindrical external surface 63 and a stepped internal piston chamber 65. A gripping end 67 of body 61 is tapered while a mounting end 69 is internally threaded for receiving a sealed, aluminum end cap 71. A pneumatic port 81 is disposed in end cap 71. Another pneumatic port 83 is disposed through the side wall of body 61. An air compressor is coupled to gripper 31 at ports 81 and 83. A 1.59 millimeter (1/16 inch) diameter hole extends between piston chamber 65 and external surface 63 to relieve an air pressure or vacuum build up by movement of the piston heads. Alternately, hydraulic fluid may be employed. Body 61 is preferably machined on a lathe from aluminum with the holes, bores, ports and chambers subsequently machined therein.

A first slide 91 and a second slide 93 are movably disposed within a laterally extending throughbore 95 of body 61. Throughbore 95 is locally coated with a Teflon anti-friction material. Each slide and arm combination defines an arm assembly. As is typical for both arms 33 and 35, exemplary arm 35 is secured to the corresponding slide 91 by way of a central screw 97 and pair of locator dowls 99. During the tool set up for each workpiece type, arm 35 can be rotationally oriented to a predetermined position relative to the corresponding slide 91 and body 61 by insertion of locator dowels 99 into the desired pair of the four provided holes 101 in slide 91. Dowels 99 are also disposed in a pair of channels 103 in arm 35. Thereafter, screw 97 is inserted to secure dowls 99 so as to prevent undesired rotation of arm 35 relative to slide 91 and body 61 during operation of the gripper.

As can best be observed in FIGS. 2, 3, 11 and 18, a piston 121 includes a single acting and stainless steel front piston head 123, a double acting and aluminum rear piston head 125, and a circular-cylindrical and longitudinally elongated piston rod 127, made from 4150 heat treated steel. Front piston 123 has a pair of angled counterbores 129 and 131 for receiving enlarged heads 133 of a pair of drive pins 135. Each drive pin 135 is made from M2 steel and has a circular-cylindrical shape along elongated shaft 137 which depends from head 133. Shaft 137 has a 3.91 millimeter (154 thousandths inch) diameter to maximize pin strength. A stepped shoulder 141 of piston rod 127 serves to abut against and retain head 133 of each drive pin 135 within counterbores 129 and 131 when a threaded end of piston rod 127 is enmeshed with a centrally threaded aperture in front piston head 123.

FIGS. 2–5 illustrate a separator or divider 151 having an externally threaded surface 153 for enmeshing with an internally threaded, median surface 155 of body 61. Separator 151 is machined from aluminum and is stationarily sealed within body 61. Piston rod 127 longitudinally translates through a central aperture in separator 151 such that front piston head 123 is disposed on a front side of separator 151 while rear piston head 125 is disposed on the opposite longitudinal side of separator 151. The total piston stroke distance is about 13 millimeters in longitudinal length for the embodiment disclosed herein. For the pin angles disclosed herein, each arm laterally moves about 5 millimeters between the gripping and ungripping positions.

An optional booster spring 161 preferably has a leading coil compressing against a trailing surface 163 of front piston head 123. A trailing coil of booster spring 161 is similarly biased against a leading surface 165 of separator 151. Accordingly, in the preferred embodiment, the helically wound, stainless steel booster spring has a preload biasing force of about 9.07 kilograms (20 pounds), thereby encouraging gripping arms 33 and 35 to remain in their gripping positions even if the pneumatic actuating force is lost. This prevents inadvertent workpiece droppage. It is alternately envisioned that the tandem or dual piston head construction may not be required for certain lower force applications, therefore, only one piston head could be used with the present invention.

Reference should now be made to FIGS. 4 and 12–17. First slide 91 has a circular-cylindrical external surface 201 within which is disposed a stepped and concentric bore 203. An elongated cylindrically-shaped receptacle 205 is accessible through external surface 201 and intersects bore 203.

Second slide 93 similarly has a circular-cylindrical external surface 211 within which is a bore 213. An angled receptacle 215 inwardly projects from external surface 211 and intersects bore 213. Second slide 93 further has a slotted boss 217 depending from an offset face 219. First and second slides 91 and 93, respectively, are movably received within throughbore 95 of body 61. Elastomeric o-rings 241 seal external surfaces 201 and 211 against the adjacent body surfaces. When assembled, boss 217 of second slide 93 is movably disposed in the larger section of bore 203. The shafts of drive pins 135 are movably received within receptacles 205 and 215.

Figure 4:
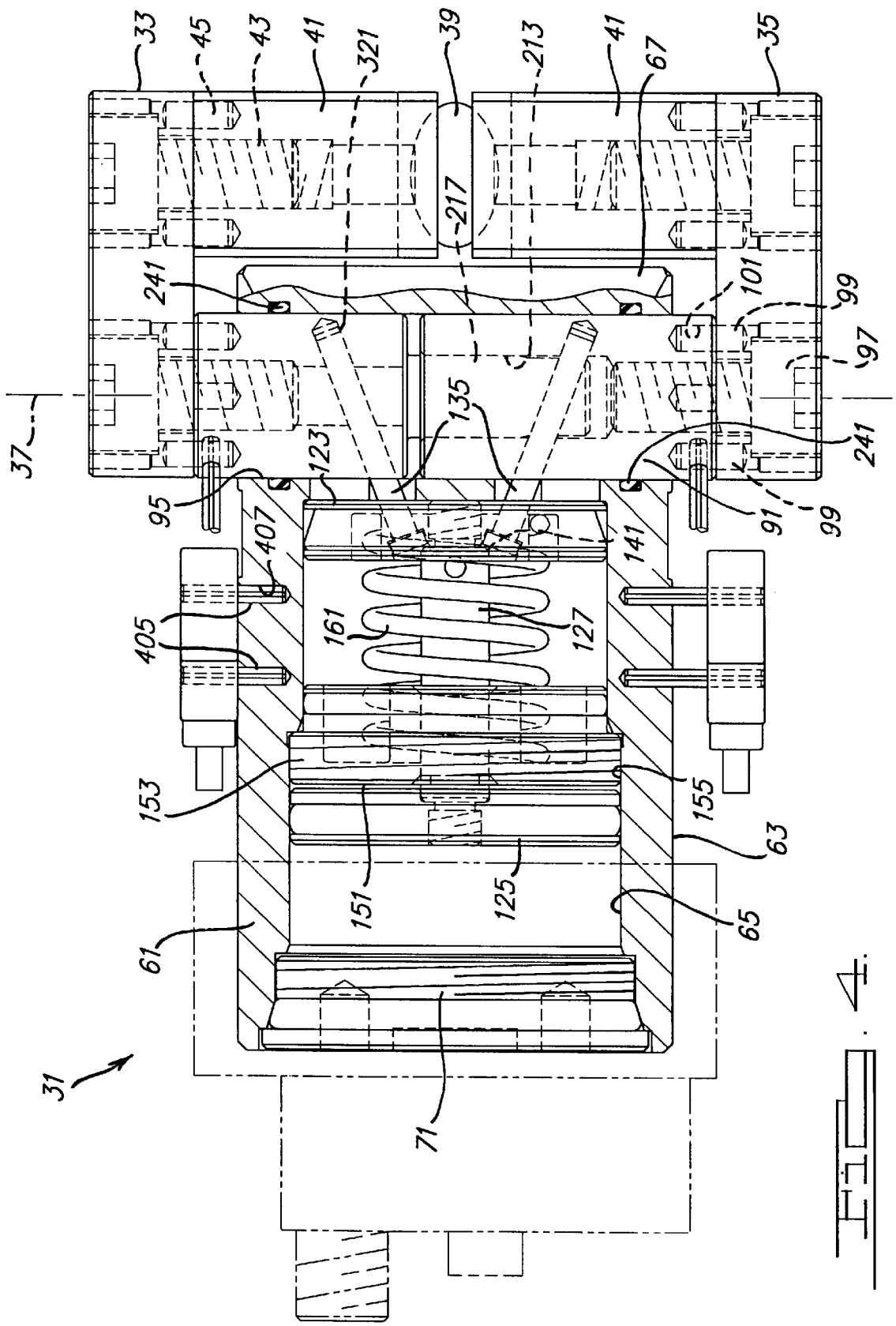
FIG. 4 is a fragmented side elevational view showing the preferred embodiment gripper with the mount removed.
Figure 5:
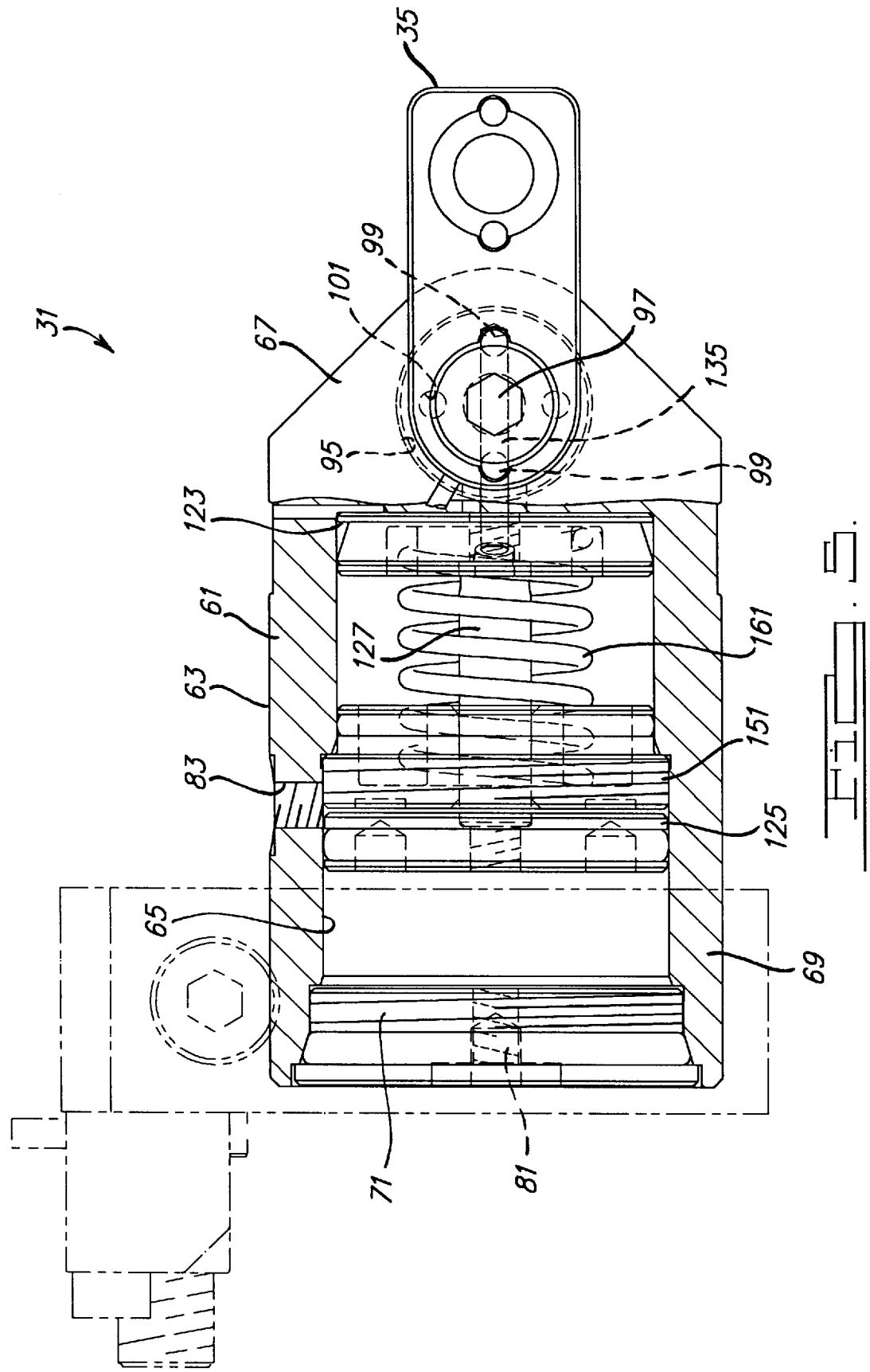
FIG. 5 is a fragmented side elevational view, taken 90° from that of FIG. 4, showing the preferred embodiment gripper.
Figure 6:
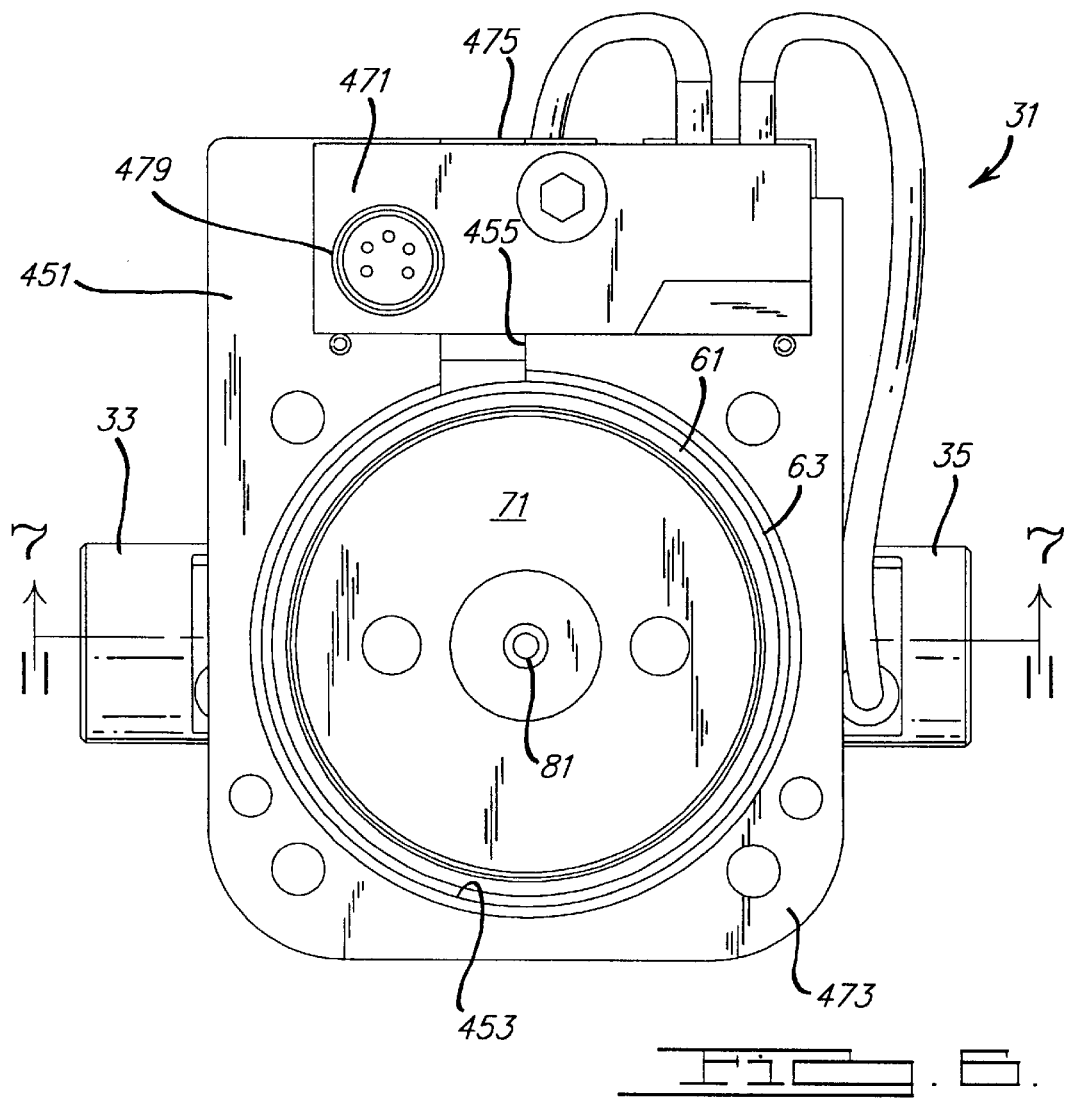
FIG. 6 is an end elevational view showing the preferred embodiment gripper.

As can be seen in FIGS. 4, 5 and 10, the shafts of drive pins 135 project through keyholed slots 301 machined within an otherwise solid platform 303 of body 61, separating piston chamber 65 from throughbore 95. Thus, slots 301 prevent drive pins 135 from rotating or cocking which, in turn, prevents slides 91 and 93 from rotating relative to body 61. A distal end 321 of each drive pin 135 is outwardly angled away from a longitudinal centerline by about 21°. However, in keeping with the function of the present invention, the exact angle may vary as long as it is between the longitudinal and lateral axes and generally pointing toward the gripping end of body 61.

FIG. 7 shows piston heads 123 and 125, and slides 91 and 93 disposed in a gripping position while FIG. 8 shows these components disposed in an ungripping position. As piston heads 123 and 125 advance from the ungripping position toward the gripping position, drive pins 135 are also longitudinally advanced and are more fully inserted into receptacles 205 and 215 of slides 91 and 93, respectively. Concurrently, the outwardly angled nature of drive pins 135 serve to laterally push slides 91 and 93 toward each other until the workpiece is fully gripped. The opposite retracting movement of piston heads 123 and 125 serve to partially withdraw drive pins 135 from receptacles 205 and 215. Thus, slides 91 and 93 are pulled away from each other. As can be observed, a minimal number of moving parts is employed in the present invention.

Referring to FIG. 4, the assembly of gripper 31 is as follows. With end cap 71 removed from body 61, drive pins 135 are secured to front piston head 123 as was previously described hereinabove and the piston/pin combination is longitudinally inserted into the piston chamber. Slides 91 and 93 are simultaneously inserted into body 61 concurrent with manual advancing of the piston/pin combination. Drive pins 135 are aligned with and inserted into the mating receptacles 205 and 215. Next, piston rod 127, separator 151 and rear piston head 125 are assembled. End cap 71 is then secured to body 61. Thus, a unitary and solid body can be employed.

Figure 19:
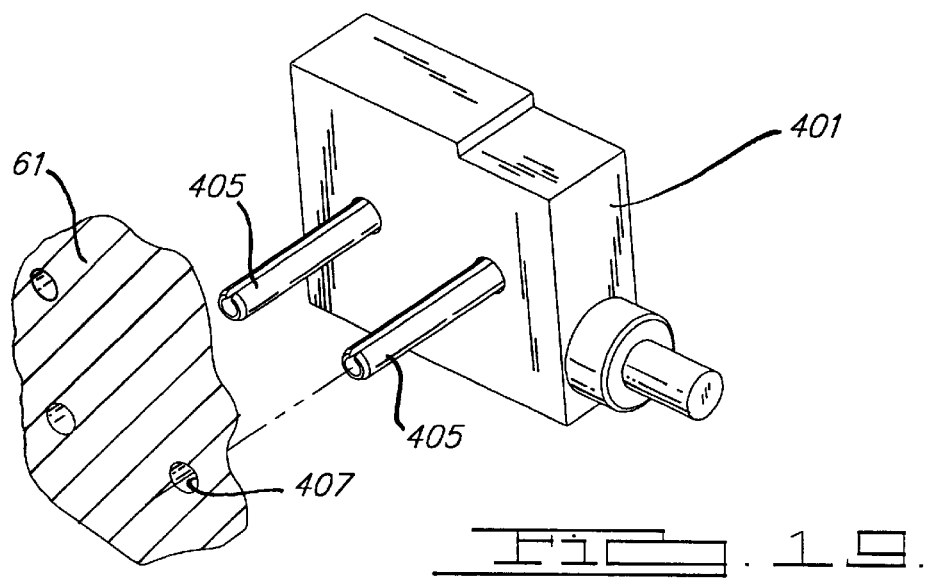
FIG. 19 is a fragmented and partially exploded perspective view showing a proximity switch and roll pins of an alternate embodiment gripper.
Figure 12:
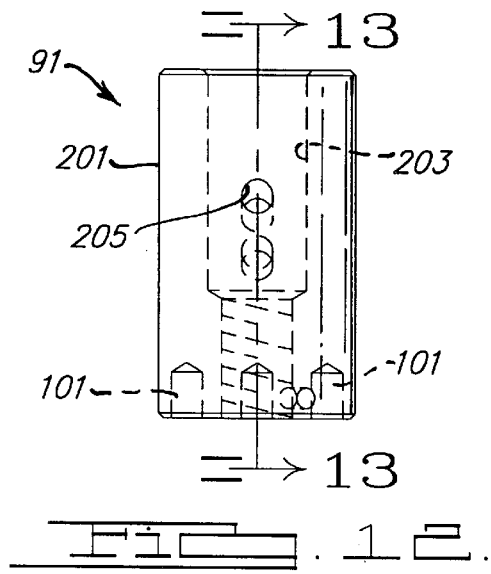
FIG. 12 is a top elevational view showing a first slide of the preferred embodiment gripper.
Figure 13:
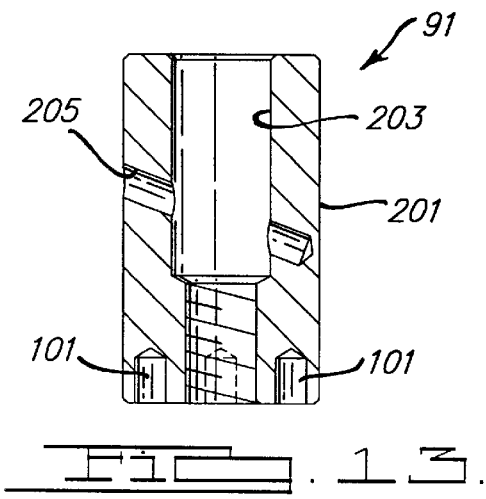
FIG. 13 is a cross sectional view, taken along line 13—13 of FIG. 12, showing the first slide of the preferred embodiment gripper.
Figure 14:
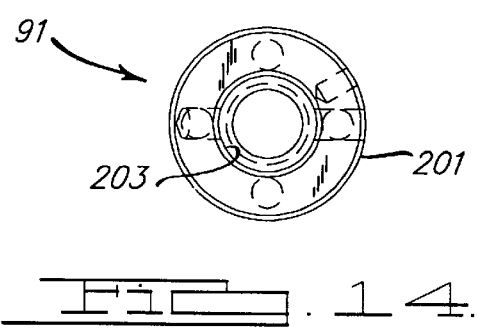
FIG. 14 is an end elevational view showing the first slide of the preferred embodiment gripper.
Figure 15:
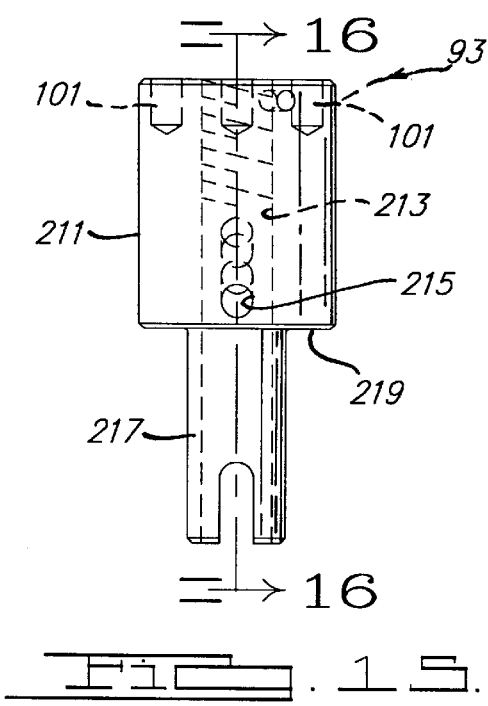
FIG. 15 is a top elevational view showing a second slide of the preferred embodiment gripper.
Figure 16:
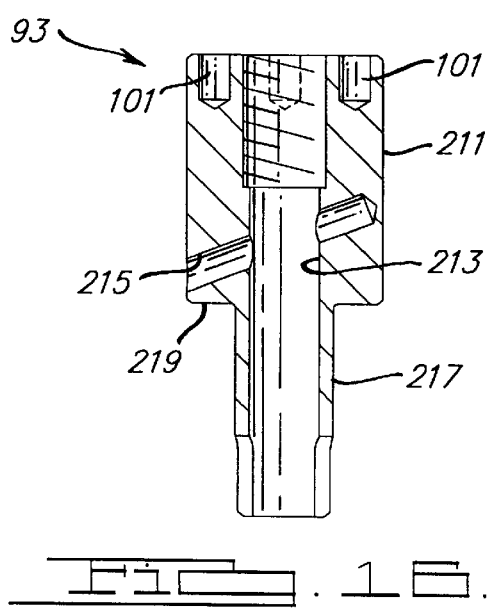
FIG. 16 is a cross sectional view, taken along line 16—16 of FIG. 15, showing the second slide of the preferred embodiment gripper.
Figure 17:
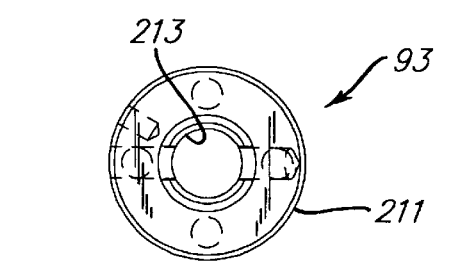
FIG. 17 is an end elevational view showing the second slide of the preferred embodiment gripper.

FIGS. 1, 4 and 19 illustrate a first proximity switch or sensor 401 having a pair of holes 403. A pair of M2×12 metallic roll pins 405 are inserted into holes 403 in a compression fit manner. Preferably, two holes 407 located in external surface 63 of body 61 receive the opposite ends of roll pins 405 in a compression fit manner. No screw on switch holding brackets are necessary. A finger 409 depends from each slide for indicating the exact positioning of the slide relative to switch 401. A second proximity switch is similarly disposed on the opposite side of body 61 but is spaced away from body 61 by a pair or M2×16 roll pins. In the alternate embodiment of FIG. 19, there are more holes 407 in body than roll pins 405 such that proximity switch 401 can be adjustably repositioned during tool set-up depending on the specific arm configuration being employed. At least three holes 407 are employed thereby creating at least perpendicularly intersecting orientation lines. Other types of sensors may be fastened to the gripper in a similar repositional manner.

An aluminum mount 451 has an internal surface 453 defining a circular-cylindrical shape for snugly engaging around external surface 63 of body 61 adjacent to mounting end 69. Mount 451 has a slot 455 which is bridged by a bolt 457. Mount 451 can be adjustably moved along and around body 61. Tightening of bolt 457 then fixedly secures mount to body 61 in the desired position. Mount 451 can be bolted onto a swivel and rod mechanism, a robotic arm, a fixed table or the like.

A proximity switch junction box 471 is mounted on either rear surface 473 (as shown) or on a side surface 475 (not shown) of mount 451. Junction box 471 is electrically connected to proximity switches 401 by cables 477. A connector 479 allows for electrical connection of junction box 471 to a remote computer or controller (not shown). Proximity switches 401 and junction box 471 are preferably purchased from Hans Turck GmbH & Co. KG of Germany as part numbers Ni2-Q6, 5-AP6-0, 10-FS4.4X3/S304 and SK1160_3.

While the preferred embodiment of the gripper has been disclosed, it will be appreciated that various modifications can be made without departing from the spirit from the present invention. For example, the slides, drive pins and arms may be differently constructed and have differing shapes while functioning as disclosed. Additionally, the gripping direction of the slides and arms can be reversed, given the same piston stroke direction and identical drive pin angles, by oppositely angling and relocating the pin receptacles in the slides; slide clearance slots would also be necessary. Moreover, the present invention drive pins and slides can be employed with other types of grippers such as that disclosed in U.S. Pat. No. 5,516,173 entitled "Gripper" which issued on May 14, 1996 to the inventor of the present invention. Various materials and angles have been disclosed in an exemplary fashion, however, it will be appreciated that differing materials and angles can be employed. It is intended by the following claims to cover these and any other departures from the disclosed embodiments which fall within the true spirit of this invention.

The invention claimed is:

1. A gripper comprising:

a body having an internal piston chamber and a gripping end;

a piston head movable in a longitudinal direction in said piston chamber;

a drive pin longitudinally moving in concert with said piston head, said drive pin being elongated in a direction substantially pointing toward said gripping end of said body; and a first slide having a receptacle for receiving and substantially surrounding a portion of said drive pin, said drive pin linearly sliding in said receptacles, longitudinal movement of said piston head causing said drive pin to move said slide in a lateral direction substantially perpendicular to said longitudinal direction.

2. The gripper of claim 1 wherein said drive pin is disposed at an angle between said longitudinal and lateral directions, said drive pin is angularly fixed relative to said piston head.

3. The gripper of claim 2 further comprising a distal end of said drive pin, disposed closest to said first slide, angling between 10° and 50° relative to said longitudinal direction.

4. The gripper of claim 1 further comprising:

a second drive pin longitudinally moving in concert with said piston head; and a second slide having a receptacle for receiving a portion of said second drive pin;

longitudinal movement of said piston head causing said second drive pin to move said second slide in another lateral direction, different from that of said first slide, concurrently with movement of said first slide.

5. The gripper of claim 4 further comprising:
an external surface of said first slide having a substantially circular-cylindrical shape and an internal bore; and
an external surface of said second slide having a substantially circular-cylindrical shape, a section of said second slide being movably disposed within said bore of said first slide.

6. The gripper of claim 4 further comprising distal ends of said drive pins being angled away from each other.

7. The gripper of claim 1 further comprising a gripping arm secured to an end of said first slide externally projecting from said body, a majority of said first slide being hidden in said body, said receptacle being linearly elongated.

8. The gripper of claim 7 further comprising a removable locator selectively inserted into a hole in said first slide and in a channel of said arm for aligning said arm in a predetermined angular orientation relative to said first slide and said body, a threaded fastener further serving to secure said arm to said first slide.

9. The gripper of claim 1 further comprising a first gripping arm deterred from rotational movement relative to said body once secured to said first slide, said gripper being further defined as a fluid powered parallel-type gripper.

10. The gripper of claim 9 further comprising:
a second gripping arm, said gripping arms providing about at least one kilo-newton of gripping force;
pneumatic pressure moving said piston head; and
a booster spring biasing said piston head and said first slide in a gripping position even when said pneumatic pressure is lost.

11. The gripper of claim 1 further comprising a proximal end of said drive pin secured to said piston head, said drive pin having a circular-cylindrical shape adjacent to said first slide, a distal end of said drive pin being further inserted into a receptacle of said first slide as said piston head advances, said distal end of said drive pin at least partially withdrawing from said receptacle as said piston head retracts.

12. A gripper comprising:
a body having an internal piston chamber;
a piston movable in a longitudinal first direction in said piston chamber;
a first pin having an angled and substantially cylindrical drive surface, said first pin longitudinally moving in concert with said piston; and
a first slide having an angled driven surface abutting against and being driven in a substantially lateral second direction by said angled drive surface.

13. The gripper of claim 12 further comprising:
a second pin having an angled drive surface, said second pin longitudinally moving in concert with said piston;
a second slide having an angled driven surface abutting against and being driven in a substantially lateral third direction by said angled drive surface of said second pin;
said second direction being substantially opposite from said third direction; and
distal ends of said pins being angled away from each other.

14. The gripper of claim 13 wherein said angled driven surfaces define receptacles which laterally surround said projections.

15. The gripper of claim 13 further comprising a gripping arm mounted to each of said slides and being restricted to parallel gripping movement.

16. The gripper of claim 12 wherein said pin is elongated and angularly fixed to a portion of said piston.

17. A straight line gripper comprising:
a piston advancing in a first linear direction in response to powered fluid pressure;
a first drive pin moving in concert with said piston;
a first slide moving in a second linear direction in response to contact by said first drive pin;
a second drive pin moving in concert with said piston;
a second slide moving in a third linear direction in response to contact by said second drive pin;
proximal ends of said drive pins being secured to said piston and being angularly fixed relative to said piston;
distal ends of said drive pins, located adjacent to said slides, being angled away from each other;
a first gripping arm secured to an end of said first slide; and
a second gripping arm secured to an end of said second slide.

18. The gripper of claim 17 wherein each of said drive pins have a circular-cylindrical shape which is inserted and at least partially withdrawn from mating receptacle in said slides, said drive pins generally point away from said piston.

19. The gripper of claim 17 further comprising a removable locator selectively inserted into a hole in said first slide and in a channel of said first arm for aligning said first arm in a predetermined angular orientation relative to said first slide, a threaded fastener further serving to secure said first arm to said first slide.

20. The gripper of claim 17 wherein said arms are deterred from rotational movement relative to said slides once secured to said slides, said gripper is a pneumatic powered parallel-type gripper.

21. The gripper of claim 17 further comprising a booster spring biasing said piston and said slides in a gripping position even when said fluid pressure is lost.

22. The gripper of claim 17 wherein said piston includes two piston heads joined by a piston rod.

23. A parallel motion gripper comprising:
a body having an internal piston chamber, a majority of an external surface of said body having a substantially cylindrical shape;
a piston head movable in a longitudinal direction in said piston chamber;
a stationary separator located in said piston chamber of said body;
a supplemental piston head movably located in said piston chamber; and
a piston rod coupling said piston heads together, said piston rod passing through an opening in said separator;
at least one drive member longitudinally moving in concert with said piston heads;
a first slide having a substantially cylindrically shaped external surface, longitudinal movement of said piston heads causing said drive member to move said slide in a lateral and linear direction substantially perpendicular to said longitudinal direction;
said drive member being angled between said longitudinal and lateral directions.

24. The gripper of claim 23 further comprising a gripping arm secured to an end of said first slide externally projecting from said body, a majority of said first slide being hidden in said body.

25. The gripper of claim 24 wherein said arm is deterred from rotational movement relative to said body once secured to said first slide, said gripper is a fluid powered parallel-type gripper.

26. The gripper of claim 23 further comprising an o-ring disposed between said exterior surface of said first slide and said body, said drive member being entirely disposed in said body, said gripper being prelubricated and entirely sealed to deter leakage of lubrication.

27. The gripper of claim 23 further comprising an external surface of a second slide having a substantially circular-cylindrical shape, a section of said second slide being movably disposed within a bore of said first slide.

28. The gripper of claim 23 further comprising
a spring disposed between one of said piston heads and said separator, said separator being externally threaded for mounting inside said piston chamber of said body.

29. A powered gripper comprising:
an arm assembly;
a gripper body having at least three body mounting holes for said arm assembly;
a powered actuator;
at least two pins; and
a sensor attached to said body solely by said pins being inserted into a corresponding number of said body mounting holes, said corresponding number being less than said at least three body mounting holes, said sensor operably sensing the position of said arm assembly, said arm assembly movable relative to said body by actuation of said powered actuator.

30. The gripper of claim 29 wherein said sensor is a proximity switch, said sensor is affixed to said body in a screw-fee manner.

31. The gripper of claim 30 further comprising a finger depending from said arm assembly moving adjacent to said proximity switch to indicate the position of said arm assembly.

32. The gripper of claim 29 further comprising a second arm assembly, each of said arm assemblies including a linearly moving slide and a gripping arm, said gripping arms being movable toward and away from each other in a parallel manner.

33. The gripper of claim 29 wherein said at least two pins includes only two metallic roll pins movably adjustable between three of said body mounting holes.

34. The gripper of claim 29 further comprising a substantially cylindrical external surface disposed on a majority of said body, said external surface having said at least three body mounting holes within which are mounted said at least two pins for retaining said sensor, said sensor being positionally adjustable relative to said body.

35. A method of operating a straight line gripper having a piston, a piston chamber, a first externally angled member, a first slide and a first gripper arm, said method comprising:
(a) flowing fluid into said piston chamber;
(b) advancing said piston in a first linear direction in response to step (a);
(c) moving said first externally angled member in concert with step (b);
(d) sliding an elongated and curved surface of said first externally angled member along a driven surface of said first slide;
(e) pushing said first slide in a second linear direction, non-parallel to said first direction, in response to step (d);
(f) moving said first gripping arm in said second direction in response to step (e);
(g) retracting said piston in a third linear direction; and
(h) pulling said first slide in a fourth linear direction in response to step (g).

36. The method of claim 35 further comprising:
(a) moving a second externally angled and cylindrically curved pin concurrently with movement of said first member;
(b) pushing a second slide in a fifth linear direction in response to step (a) when said first slide moves in said second direction; and
(c) moving a second gripper arm in response to step (b).

37. A gripper comprising:
a piston movable in an axial direction;
a drive pin connected to said piston at an oblique angle with respect to said axial direction; and
a slide engaged by said drive pin, wherein movement of said piston causes said drive pin to be selectively inserted into and withdrawn from said slide thereby moving said slide in a substantially lateral direction.

* * * * *

UNITED STATES PATENT AND TRADEMARK OFFICE
CERTIFICATE OF CORRECTION

PATENT NO. : 5,871,250
DATED : February 16, 1999
INVENTOR(S) : Edwin G. Sawdon

It is certified that error appears in the above-indentified patent and that said Letters Patent is hereby corrected as shown below:

Column 1, line 34, "Blaft" should be -- Blatt --.

Column 3, line 48, "farther" should be -- further --.

Column 4, line 9, "dowls" should be -- dowels --.

Column 5, line 56, "or" should be -- of --.

Column 6, line 16, "SK1160_3" should be -- SK1160-3 --.

Column 6, line 50, "receptacles" should be -- receptacle --.

Column 9, line 30, "screw-fee" should be -- screw-free --.

Signed and Sealed this

Second Day of November, 1999

Attest:

Attesting Officer

Q. TODD DICKINSON

Acting Commissioner of Patents and Trademarks